(12) United States Patent
Pilozzi et al.

(10) Patent No.: US 6,266,376 B1
(45) Date of Patent: Jul. 24, 2001

(54) SYSTEM AND METHOD FOR ADJUSTING PCM DATA FRAMES FOR ROBBED BIT SIGNALING IN A TELEPHONE NETWORK

(75) Inventors: John Pilozzi, Stow; Dae-Young Kim, Lexington; Sepehr Mehrabanzad, Southborough; Patrick Maurer, Reading, all of MA (US); Jack Liu, Woodridge; S. Arif Ahmed, Rolling Meadows, both of IL (US); Vladimir Parizhsky, New York, NY (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/499,088

(22) Filed: Feb. 4, 2000

(51) Int. Cl.[7] .................................................. H04B 14/04
(52) U.S. Cl. ........................ 375/254; 375/222; 375/242; 375/265
(58) Field of Search ..................... 375/222, 242, 375/254, 257, 265, 295, 296; 341/155; 714/792

(56) References Cited

U.S. PATENT DOCUMENTS

| | | | | |
|---|---|---|---|---|
| 5,729,226 | * | 3/1998 | Betts et al. ............................... | 341/94 |
| 5,754,594 | * | 5/1998 | Betts et al. ............................... | 375/285 |
| 5,875,229 | * | 2/1999 | Eyuboglu et al. ........................ | 379/1 |
| 6,009,121 | * | 12/1999 | Waldron et al. ......................... | 375/254 |
| 6,034,991 | * | 3/2000 | Zhou et al. .............................. | 375/222 |
| 6,072,825 | * | 6/2000 | Betts et al. .............................. | 375/222 |
| 6,084,915 | * | 7/2000 | Williams ................................. | 375/242 |
| 6,178,200 | * | 1/2001 | Okunev et al. .......................... | 375/222 |
| 6,181,752 | * | 1/2001 | Kim ......................................... | 375/346 |
| 6,198,766 | * | 3/2001 | Eyuboglu et al. ...................... | 375/286 |
| 6,201,836 | * | 3/2001 | Kim ......................................... | 375/265 |
| 6,201,842 | * | 3/2001 | Kim ......................................... | 375/346 |

* cited by examiner

Primary Examiner—Stephen Chin
Assistant Examiner—Chieh M. Fan

(57) ABSTRACT

A system and method for shifting the relative phases of a PCM data frame and a network RBS frame by one or more symbols is disclosed. The method includes determining whether or not RBS is present. If RBS is present, the slots affected by RBS are identified. Next it is determined what data slots, if any, are affected by encoding. The PCM data frame is shifted so the RBS constraint and the encoding constraint do not coincide at any particular data slot. For one particular PCM upstream modulation scheme, the digital modem adjusts the relative phases of the data-mode frame and network RBS frame such that a minimum number of trellis-modified symbols fall on network RBS affected slots. This information is transmitted to an analog modem. The amount of shift can be conveyed to an analog modem in the same data sequence used to send upstream constellation sets and mapping parameters during an initial training sequence. The present invention improves the performance of any PCM modem that employs a data frame structure in which not all symbols are subject to the same constraints, for example, due to trellis coding.

14 Claims, 5 Drawing Sheets

SYSTEM AND METHOD FOR ADJUSTING PCM DATA FRAMES FOR ROBBED BIT SIGNALING IN A TELEPHONE NETWORK

FIELD OF THE INVENTION

This invention is directed towards data transmission over telephone networks, and more particularly towards a method for reducing the effects of robbed bit signaling.

BACKGROUND

The Public Switched Telephone Network (PSTN) is now almost completely digital. The "last mile" between the central office (CO) and a telephone set, also known as the "local loop", is the only analog portion of the telephone network. The central office and backbone of the telephone network is completely digital.

Digital signals on the US network are transmitted over a variety of carrier media, including T-carrier systems such as T1 lines. T1 lines operate at 1.544 Mbps and carry a maximum of 24 64-Kbps voice channels. T1 (and T3) lines utilize a sampling technique called Pulse Code Modulation (PCM) for conversion between analog and digital signals. The analog signal is sampled at 8 kHz and quantized with an 8-bit/sample quantizer to form digital information that allows the original analog signal to be recreated at a receiving location. A connection between an end user on a local loop and one on the digital network can be referred to as a "PCM channel".

T1 lines use a framing structure in which each of 24 voice channels is allotted 8 bits. The T1 frame consists of 193 bits, where the extra bit is appended to signify the frame boundary. From the point of view of a single voice channel, frames consist of 8 bits. A frame viewed from the perspective of a single channel can be referred to as a "PCM frame" or a "slot".

It is possible to send data into the digital network through the local loop as well as analog signals. In order to send data, it is necessary to format the data to fit the PCM channel constraints. An example sequence of PCM frames 10 is shown in FIG. 1. For digitized analog signals, each slot S holds one 8-bit sample of the analog signal. For data, the modulation scheme maps bits to symbols and symbols to a constellation. The sequence of constellation points resulting from the data is converted to an analog signal and transmitted through the local loop. The network treats this signal as it would any analog signal.

Each frame can contain network signaling information as well as the digitized samples. The signaling information is used to indicate information such as the status of a call, or whether a phone is off the hook. An in-band signaling technique called Robbed Bit Signaling (RBS) is used to carry signaling information over a T1 line. Because there is no spare bandwidth to carry signaling information, RBS periodically "robs" one bit from a particular frame. This bit is then used for signaling information. A standardized RBS for individual T1 lines robs 1 bit of every sixth frame. This bit is the least significant bit (as shown by 12 and 14 of FIG. 1). Therefore every sixth sample of voice encoding contains 7 bits of voice data and 1 bit of signaling information. The degradation caused by RBS to voice samples is fairly minimal.

It is convenient to describe a PCM frame stream as a continuous periodic repetition of "RBS Frames" 16. Each RBS frame 16 is composed of six slots S. Each slot contains one 8-bit PCM codeword (referred to as an "octet"). Once a call is established, the specific slots affected by RBS remain fixed for the duration of the call. For the example shown in FIG. 1, slot S6, slot S12, etc. are affected by RBS.

Different carriers in the network can choose a different slot out of the RBS frame to rob. As the sequence of slots passes through the network, multiple slots within an RBS frame can be affected. The pattern of robbed bits observed at the output is identical from RBS frame to RBS frame.

Because RBS robs information, it causes problems when data are being transmitted. As previously described, the loss to voice (analog) information is fairly minimal. However, when digital data are being transmitted or received, such as by a modem, the periodic loss of a data bit causes continual errors. From a modem's perspective, RBS increases quantization noise for certain slots in the upstream data by stripping off one bit 12, 14 of information that is normally used to convey the least significant bit of the PCM code carrying the received upstream signal amplitude at the central office codec. In other words, RBS imposes a constraint on the system.

In order to cope with RBS, PCM modems such as those that conform to ITU-V.90 must impose a more restrictive design constraint when selecting constellations for slots affected by RBS. The design constraint typically reduces the total number of constellation points, or equivalently, increases the minimum code point distance an RBS affected slot can reliably support. PCM modems must select different constellation points for slots affected by RBS.

The following example illustrates how the V.90 Standard copes with RBS. In V.90, the first symbol of TRN2d is designated as slot 0 of the RBS frame. The length TRN2d and all training sequences thereafter are constrained such that the first symbol of each data-mode frame also falls on slot 0 of the RBS frame. This is accomplished by extending each subsequent transmitted field's length to a symbol span that is an integer multiple of six octets. Therefore, in data mode, the RBS slot of each symbol in the data frame, or equivalently the position of the V.90 downstream data-frame relative to the network RBS frame, is haphazardly decided by the timing of the digital PCM modem transmitter and is fixed after the start of TRN2d for data mode and for all subsequent rate negotiations.

Similarly to ITU-V.90 like PCM modems, the design of PCM upstream modulation schemes must be constrained as a result of RBS. Because a PCM modulation scheme like the one disclosed in U.S. patent application Ser. No. 09/234,451 filed on Jan. 20, 1999, imposes an additional design constraint due to trellis coding, the V.90 method for dealing with RBS cannot be utilized efficiently with a PCM upstream modulation scheme. Any coding scheme that places a restriction on a symbol based on previous symbols may conflict with the RBS restriction, reducing efficiency. Thus, both the data frame position and network RBS frame position impose constraints on the constellation points and mapping parameters that may be successfully employed for specific slots within the data frame. In the disclosed PCM upstream modulation scheme, additional constraints are imposed on the possible constellation sets and mapping parameters so the power constraint can be satisfied for trellis modified data-frame slots 3, 7, and 11.

Unfortunately, the solution utilized by V.90 to overcome RBS constraints does not work for PCM upstream modulation schemes. As an example, the upstream data frame for V.92 is 12 slots long. Fixing the first symbol of each upstream data frame to coincide with the first symbol of the training sequence transmitted by the analog PCM modem does not provide a satisfactory solution because together the RBS and trellis coding constraints can over-constrain the transmit constellation. Thus, there is a need for a method that can be utilized with a PCM upstream modulation scheme that allows a digital modem to adjust the relative phases of the network RBS frame and the upstream data mode frame so the RBS affected slots coincide minimally with the trellis modified symbols. If the RBS affected slots coincide with slots affected by encoding, the system has a low amount of flexibility, resulting in degradation of performance.

SUMMARY

The present invention provides a method for shifting the relative phases of a PCM data frame and a network RBS frame by one or more symbols. First, it is determined whether or not RBS is present. If RBS is present, the present invention determines which data slots, if any, are affected by encoding. Then the PCM data frame is shifted, if necessary, so the RBS constraint and the encoding constraint do not coincide at any particular data slot.

According to one embodiment of the present invention, a digital modem adjusts the relative phases of the data-mode frame and network RBS frame such that a minimum number of trellis modified symbols (data frame slots 3,7, and 11) fall on network RBS affected slots. The information is then transmitted to an analog modem. The amount of shift can be conveyed to an analog modem in the same data sequence used to send upstream constellation sets and mapping parameters during an initial training sequence.

The present invention also includes a method for reducing the loss in information throughput due to RBS in a PCM data frame containing a stream of symbols. The method includes determining if RBS is affecting the PCM data frame; and if so, determining which slots in the PCM data frame are affected by RBS. The method includes determining which slots, if any, in the PCM data frame are being constrained by encoding of symbols; and determining an adjustment to the insertion of symbols into slots in the PCM data frame such that a reduced number of symbols are affected by both RBS and encoding. Based on the determined adjustment, a source of the stream of symbols is adjusted.

The source of the stream of symbols can be an analog modem, and the analog modem can perform the step of determining an adjustment to the insertion of symbols into slots in the PCM data frame. Alternatively, a digital modem receiving the PCM data from the analog modem can perform the step of determining an adjustment to the insertion of symbols into slots in the PCM data frame; and the digital modem can communicate the determined adjustment to the analog modem. This communication can take place during an initial training sequence between the modems.

The determined adjustment includes an adjustment to the relative phase of the PCM data frame, or a symbol order permutation, or both. Encoding includes trellis encoding. The encoding can have dependencies between symbols in different slots.

Advantages of the present invention include improved performance of any PCM modem that employs a data frame structure in which not all symbols are subject to the same constraints, for example, due to trellis coding.

Another advantage of the present invention is an ability to adjust the relative phases or symbol permutation of a network RBS frame and an upstream PCM data frame during an initial training sequence in order to achieve the highest possible upstream bit rate given detected loop characteristics, upstream digital impairments, and the APCM power constraint.

Yet another advantage of the present invention is an ability to adjust the relative phases of a PCM data frame and a network RBS frame such that a minimum number of trellis modified symbols (data frame slots 3,7, and 11 in the example) fall on network RBS affected slots.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
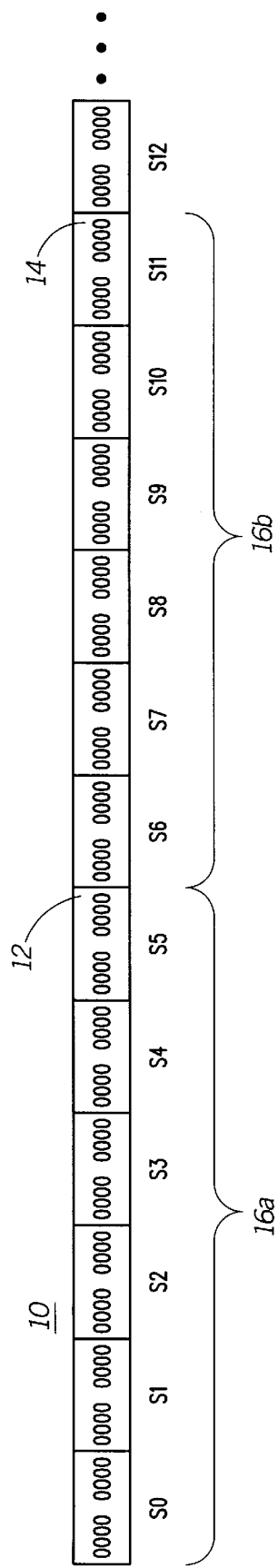
FIG. 1 shows an example PCM data frame.

The present invention is utilized with a PCM upstream modulation scheme like the one described in U.S. patent application Ser. No. 09/234,451 filed on Jan. 20, 1999, assigned to Motorola Inc. and incorporated herein by reference. As shown in FIG. 1, a PCM data frame is designed such that 3 specific symbols in each 12 slot date frame (data slots S3, S7, and S11) carry a redundant bit of information generated by a trellis encoder. Every fourth data slot beginning with slot 3 contains redundant information. This particular coding scheme and frame structure is representative of the planned PCM upstream transmission structure. However, it is only an example of the general situation where a predictable but uncontrollable constellation constraint or other channel impairment coincides with transmitter or receiver constraints in a periodic manner. If the data frame structure is not an integer multiple of the least common multiple (LCM) of the RBS frame and the "trellis frame" (the block of symbols corresponding to a single multidimensional symbol in the trellis code), then the coincidence of RBS-affected slots and trellis-restricted slots will rotate data-frame to data-frame. If for a particular network or situation the period of the network constraint (such as RBS) and the modulation constraint (such as multidimensional trellis coding) are known or can be determined, this rotation can be tracked and adjusted for using a time-varying symbol permutation. This requires some extra complexity in the encoder and decoder.

Every system with encoding has some type of frame structure. V.34 has its own frame structure. Depending on the particular type of encoding utilized, different symbols will have different constraints.

In above-described PCM upstream modulation scheme, the constellation sets for the special slots are partitioned into 2 sets of equal size. Depending on the state of the trellis encoder, only one of the two subsets of points can be used to carry user information. This imposes additional constraints on the constellation sets that can be selected and employed for data slots S3, S7, and S11 in the example. The constraints imposed on different symbols may vary. One constraint imposed by the state of the trellis encoder is that constellation sets for these slots must have an even number of points. Another constraint imposed by the state of the trellis encoder affects the mapper and requires the number of equivalence classes to be the same for both constellation subsets. Once constellation sets are selected, the maximum number of supportable equivalent classes for each data slot is also constrained by the analog PCM modem's transmitter power limitation. Constraining the maximum number of supportable equivalence classes for each data slot limits the bit rate of the upstream data.

Figure 2:
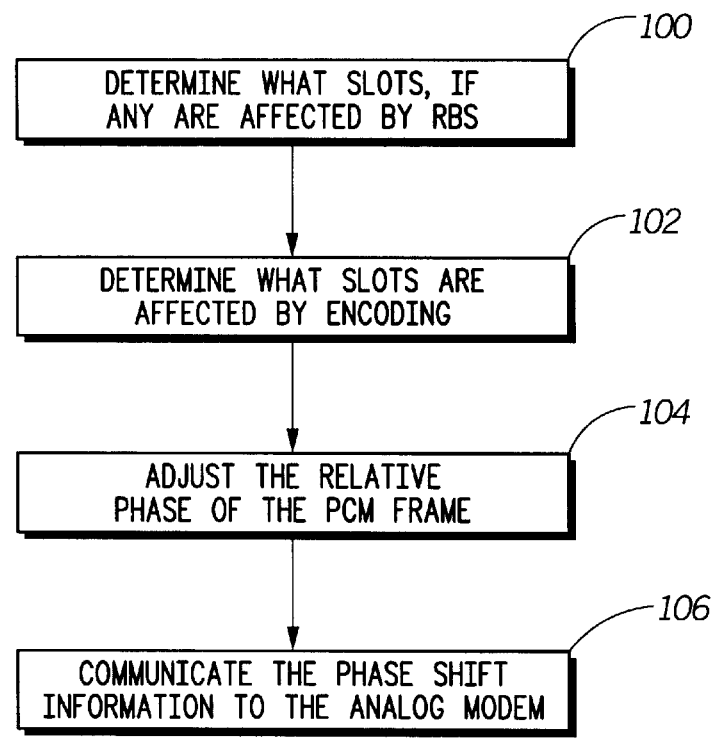
FIG. 2 is a flow chart illustrating the steps performed according to the present invention.

The steps performed according to the present invention are shown in FIG. 2. Once a call is made, the RBS affected slots are set through the duration of the call. First, the present invention determines what slots, if any, are affected by RBS, step 100. This is performed before a data connection is made and before the training procedure is begun. A method for detecting RBS affected slots is described in U.S. patent application Ser. No. 09/092,786 filed on Jun. 5, 1998, assigned to Motorola Inc. and which is hereby incorporated by reference. Basically, the RBS affected slots are determined by differences between what the analog modem is sending and what the digital modem is receiving.

The step 102 in the present invention involves determining which slots are affected by encoding. The slots affected by trellis coding are typically known, being a property of the modems and not the network. In the example data frame shown in FIG. 1, every fourth slot after slot S2 is affected (starting with slot S3).

In the next step 104 FIG. 2 of the present invention, the digital modem adjusts the relative phases of the data frame and the network RBS frame such that a minimum number of symbols are affected by both RBS and trellis coding. It is possible that no adjustment is necessary, in that the symbols do not coincide with RBS and coding. In the example shown in FIG. 1 the digital modem determines an adjustment to the relative phases of the data frame and the network RBS frame such that a minimum number of trellis modified symbols (data frame slots S3, S7, and S11) coincide with RBS affected slots S5 and S11.

In the next step 106 FIG. 2 the digital modem communicates the phase shift information to an analog modem. During the training sequence of any upstream direction ITU-V.90 like PCM modem connection, the digital modem probes both the analog channel and upstream digital network path for impairments in order to design a set of transmitter parameters that will allow the highest data transfer rate from the analog modem to the digital modem. These parameters are passed to the analog modem for use by its transmitter during the data transfer session.

Figure 3:
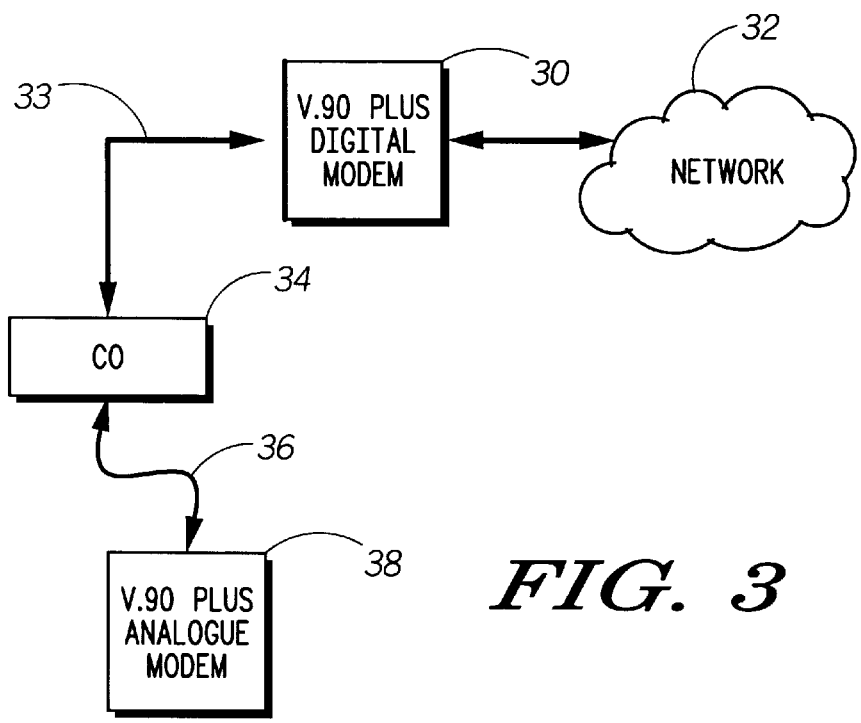
FIG. 3 is a block diagram of a telephone network which is used in an illustrative embodiment of the present invention.

An illustrative embodiment of the present invention is shown with a telephone circuit in FIG. 3. A digital modem 30 is connected to a network 32 which includes a backbone system, digital links, or a connection to a node network system such as an Internet Service Provider (ISP). The digital modem 30 communicates through the Telephone Central Office (CO) 34, and over an analog phone connection 36 with an analog modem 38 at a user site. The analog modem 38 sends and receives data from the user (typically through a serial or parallel connection to a computer) and encodes the data in a proper form to be transmitted as analog signals over the analog line 36 to the CO 34. The analog signal is then converted into PCM data, as is well known in the art. The PCM data travel over a connection 33 to the location of the digital modem 30. Typically, the connection 33 is a T1 (or T3) connection, and the PCM data are therefore transmitted and received using data frames, and with RBS constraints imposed upon the data.

The present invention will improve the performance of any PCM modem that employs a data-frame structure in which not all symbols are subject to the same constraints, e.g. because of trellis coding. V.90 does not have coding downstream so all of its symbols are essentially equal. However, if coding was incorporated in V.90 in the downstream direction, the present invention could be utilized by a modem in a manner similar to that defined here for the upstream.

Figure 4:
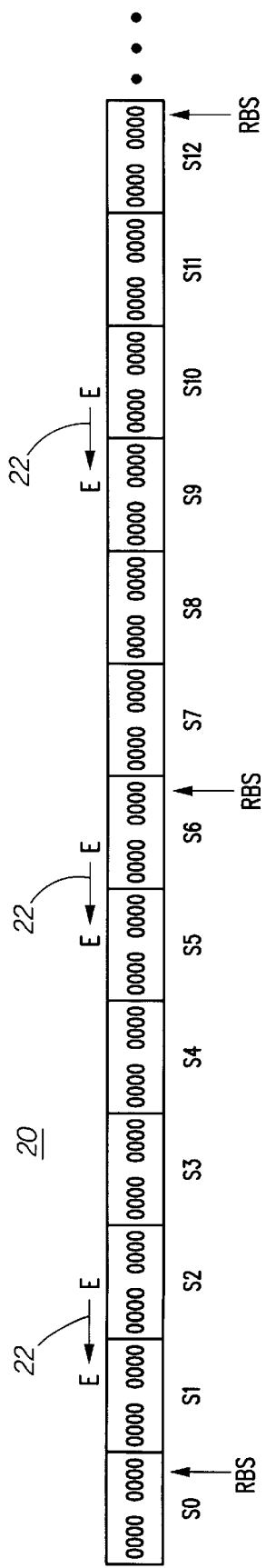
FIG. 4 illustrates the method of adjusting the relative phases of the data-mode frame and network RBS frame according to the present invention.

The following example describing the operation of the present invention is provided for illustrative purposes only. In FIG. 4, a PCM data frame 20 is shown. As disclosed in Kim's PCM upstream modulation scheme, data slots S2, S6, and S10 are affected by a trellis encoder. In this example, RBS affects data slot S0 and has a period of six. Therefore the RBS affects S6, S12 etc. The RBS constraint and the trellis encoding constraint coincide in data slot S6, and periodically following, for example data slot S18 (not shown) etc. If the RBS constraint and the trellis constraint were allowed to periodically coincide in data slots, the system would lose flexibility. In order to maintain maximum flexibility, the present invention shifts the phase of the PCM data frame relative to the network RBS frame to prevent the RBS constraint from coinciding with the trellis encoding constraint. In this example, the PCM frame start index is shifted one slot to the left to prevent the RBS constraint from coinciding with the trellis encoding constraint. As shown by arrow 22, this results in the trellis encoding shifting to data slots S1, S5, S9 etc. There no longer is any periodic coinciding of RBS and trellis affected slots. A digital modem communicates the phase shift information to an analog modem during an initial training sequence.

In some situations, phase adjustment will completely alleviate the joint restrictions of RBS and trellis coding, while in others the number of occurrences of such an overlap can be minimized without symbol order permutation. An alternate method is to define a symbol permutation within the RBS frame, shuffling the trellis code restricted symbols into RBS-unaffected slots. A symbol permutation restricted to be within a single data frame and without a phase adjustment could however necessitate a joint decision among these symbols, increasing the system complexity relative to the usual symbol-by-symbol determination. The joint decision would be useful if the trellis-affected symbol were relocated to a slot occurring earlier in time than the symbol's "trellis mates" (the other symbols in the trellis frame).

The trellis-affected symbol depends on the values chosen for its trellis mates. The trellis-unaffected symbols are freely chosen among points in an equivalence class. The particular point within an equivalence class is chosen to minimize transmit power, a metric which depends on the past history of symbols. If the trellis-affected symbol is placed earlier in time than one of its trellis-unaffected mates, then the trellis-affected symbol depends on a future symbol. This future symbol in turn depends on the trellis-affected symbol for power minimization. Because the order of dependence is different for these two (or more) symbols, (i.e., the notion of time is destroyed), these two (or more) symbols must be determined jointly rather than one after another. If a search over N points or classes is required for a single symbol determination, then a search over $N^K$ point or class sets is required for joint determination over K symbols. For typical values of N and K, the joint search space $N^K$ is much greater than KN, search space size for the symbol-by-symbol determination of K symbols.

As an example, take the following normal symbol order for a trellis frame, S0, S1, S2, S3, where S3 is trellis-affected, is permuted to become S0, S1, S3, S2. Then the symbols S2 and S3 must be determined jointly in light of the trellis restriction and power minimization restriction.

This joint determination occurs with the following procedure:
1. Choose S0 freely.
2. Choose S1 freely.
3. Choose the power minimizing value for S3 for each trellis subset.
4. For each possible choice of S3 from step 3, choose the corresponding power minimizing value for S2.
5. Assign the S3, S2 pair that minimizes the cumulative power to this point.

The need for joint determination exists only if a trellis-affected symbol is to be sent before one of its trellis mates. Another solution, which is referred to as "Phase Shift and Restricted Reordering" (PSRR), allows symbol permutation, but adds the restriction that a trellis-affected symbol shall not precede any of its trellis mates. Taken in combination with a phase shift, this embodiment can guarantee a minimum of overlap between trellis-affected symbols and RBS affected slots. This is an advantage over a phase-shift-only method, because a phase shift alone can achieve a minimum of overlap over all possible phases, but is not guaranteed to achieve the minimum possible overlap over all symbol orderings. PSRR has an advantage over a permutation-only method in that permutation alone can achieve a minimum possible overlap over all symbol orderings, but will often require increased computational complexity.

Figure 5:
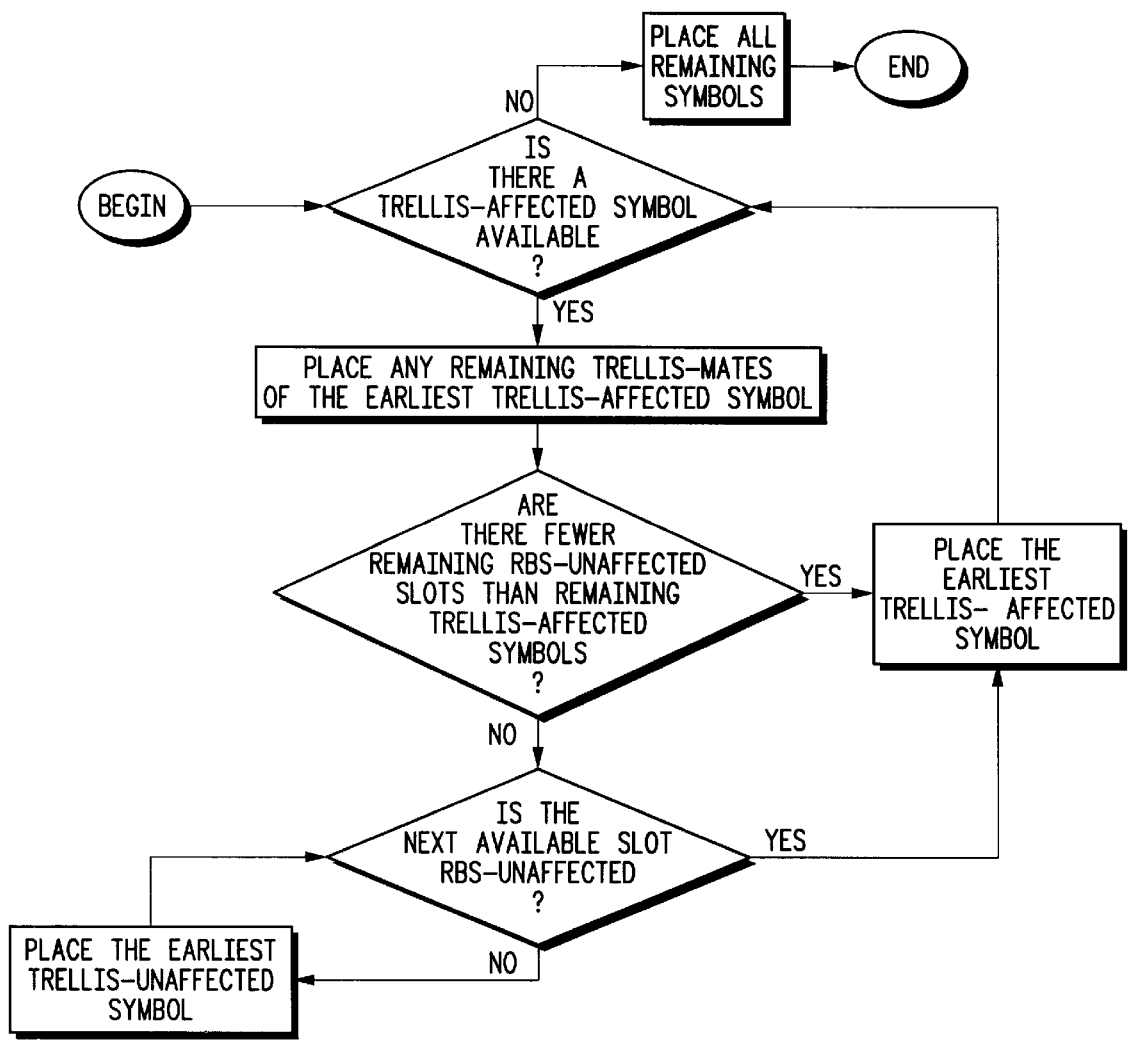
FIG. 5 shows the steps performed by another embodiment of the present invention.

The steps performed by this embodiment of the present invention are shown in reference to FIG. 5. The first step of PSRR is to determine from the RBS pattern the desired phase shift. If a phase shift alone can achieve the minimum overlap between trellis-affected symbols and RBS-affected slots, then the analog modem shifts its phase accordingly and the adjustment is complete. If a phase shift alone cannot achieve the minimum overlap, then choose the phase such that the maximum number of consecutively occurring RBS-affected slots occurs starting with the first slot in the data frame. Starting with the first data frame slot, follow the procedure shown in FIG. 5 to place each symbol in the appropriate slot.

Figure 6:
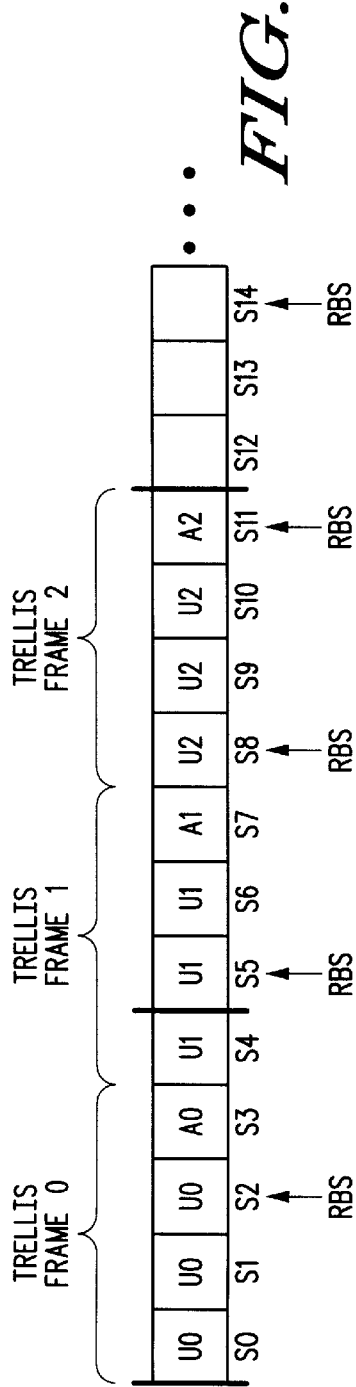
FIG. 6 shows an example trellis data frame affected by RBS.

An example is shown beginning with the data frame in FIG. 6. The slots are labeled S0 through S11. Slots affected by RBS are shown having arrows pointing to them, in this case, slots S2, S5, S8, and S11 are affected by RBS. Symbols unconstrained by trellis coding are labeled "U", while those affected by the trellis code are labeled "A". Symbols are further assigned a number corresponding to the trellis frame to which they belong, i.e., a number defining which symbols are trellis-mates of one another. In this case, symbols in slots S3, S7, and S11 are affected. The data frame has one overlapping RBS and trellis affected slot, S11. A phase shift alone cannot reduce the overlap below 1 per data frame.

Figure 7:
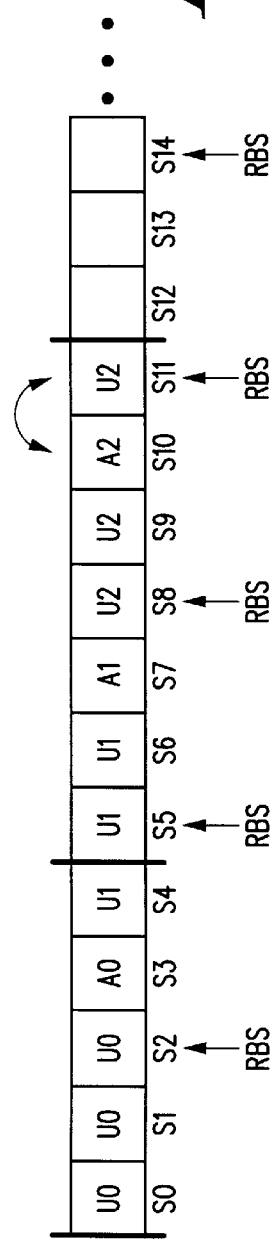
FIG. 7 shows how an illustrative embodiment of the present invention modifies the data frame shown in FIG. 6.

A permutation-only method might switch the symbols in S10 and S11, as shown in FIG. 7. The trellis-affected symbol is now in slot S10, which is unaffected by RBS. This solution requires a joint determination of symbols in slots S10 and S11.

Figure 8:
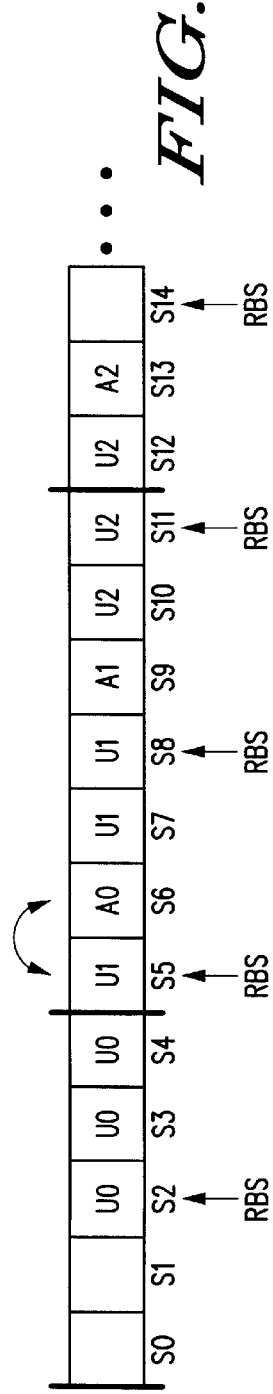
FIG. 8 shows how another illustrative embodiment of the present invention modifies the data frame shown in FIG. 6.

An example of the PSRR solution to the problem in FIG. 6 is shown in FIG. 8. PSRR first shifts the data frame to the right 2 slots, so the data frame now occupies slots S2 through S13. The only overlap between RBS and trellis constraints after the phase adjustment is in slot S5, which would have held symbol A0. The procedure defined in FIG. 5 has the effect of switching symbol A0 with the first trellis-unaffected member of trellis frame 1, U1. The overlap is reduced to zero, without destroying the notion of time, and thus requiring no additional complexity in data mode.

Advantages of the phase-only approach include simplicity of adjustment implementation, zero complexity increase after completion of the adjustment (i.e., in data mode), and the ability to minimize overlap between RBS and trellis constraints subject to a fixed symbol order.

Advantages of the permutation-only approach include an ability to guarantee the absolute minimum overlap between RBS and trellis constraints.

Advantages of PSRR include almost zero complexity increase after completion of the adjustment, and an ability to guarantee the absolute minimum overlap between RBS and trellis constraints.

The present invention is ideal in situations where there is a lot of noise on a line (low signal to noise ratio), and the line must support a high data rate for some application. Because RBS affects particular data slots, the data rate must be lowered. As a result, the data rate might be so low that a connection is no longer able to support the desired application. The present invention overcomes this situation by effectively reducing the quantization noise and thereby supporting the higher data rate.

Although the present invention has been described in terms of trellis coding and RBS constraints, the present invention works for any streaming frame system with periodic slot stealing or corruption.

Although the invention has been shown and described with respect to illustrative embodiments thereof, various other changes, omissions and additions in the form and detail thereof may be made therein without departing from the spirit and scope of the invention.

What is claimed is:

1. A method for reducing the loss in information throughput due to RBS in a PCM data frame containing a stream of symbols, said method comprising:
   determining if RBS is affecting said PCM data frame;
   if RBS is affecting said PCM data frame, determining which slots in said PCM data frame are affected by RBS;
   determining which slots, if any, in said PCM data frame are being constrained by encoding of symbols;
   determining an adjustment to the insertion of symbols into slots in said PCM data frame such that a reduced number of symbols are affected by both RBS and encoding; and
   based on said determined adjustment, adjusting a source of said stream of symbols.

2. The method according to claim 1 wherein said source of said stream of symbols is an analog modem.

3. The method according to claim 2 wherein said analog modem performs said step of determining an adjustment to the insertion of symbols into slots in said PCM data frame.

4. The method according to claim 2 wherein a digital modem, receiving said PCM data from said analog modem, performs said step of determining an adjustment to the insertion of symbols into slots in said PCM data frame; and said digital modem communicates said determined adjustment to said analog modem.

5. The method according to claim 4 wherein said digital modem communicates said determined adjustment to said analog modem during an initial training sequence.

6. The method according to claim 1 wherein said determined adjustment includes an adjustment to the relative phase of said PCM data frame.

7. The method according to claim 1 wherein said determined adjustment includes a symbol order permutation.

8. The method according to claim 1 wherein said determined adjustment includes an adjustment to the relative phase of said PCM data frame, and a symbol order permutation.

9. The method according to claim 1 where said encoding is trellis encoding.

10. The method according to claim 1 where said encoding has dependencies between symbols in different slots.

11. A system for sending data over a telephone circuit including an analog link, comprising:
   an analog modem, coupled to said analog link;
   a digital modem, coupled to a digital connection, said digital connection being switched onto said analog link, and said digital connection performing conversion of analog signals to a PCM data frame; said digital modem performing the steps of:
      determining if RBS is affecting said PCM data frame;
      if RBS is affecting said PCM data frame, determining which slots in said PCM data frame are being affected by RBS;
      determining which slots, if any, in said PCM data frame are being constrained by encoding; and
   wherein said analog modem adjusts said analog signals according to a determined adjustment to said analog signal such that a reduced number of slots in said PCM data frame are affected by both RBS and encoding.

12. The system according to claim 11 wherein said determined adjustment includes an adjustment to the relative phase of said PCM data frame.

13. The system according to claim 11 wherein said determined adjustment includes a symbol order permutation.

14. The system according to claim 11 wherein said determined adjustment includes both an adjustment to the relative phase of said PCM data frame and a symbol order permutation.

* * * * *

UNITED STATES PATENT AND TRADEMARK OFFICE
CERTIFICATE OF CORRECTION

PATENT NO.   : 6,266,376 B1
DATED        : July 24, 2001
INVENTOR(S)  : John Pilozzi et al.

It is certified that error appears in the above-identified patent and that said Letters Patent is hereby corrected as shown below:

<u>Title page,</u>
Item [73], Assignee, add the following:
-- 3COM Corporation, Santa Clara, CA --

Signed and Sealed this

Sixteenth Day of July, 2002

Attest:

Attesting Officer

JAMES E. ROGAN
*Director of the United States Patent and Trademark Office*